C. D. EVERETT & A. BALDWIN.

Improvement in Felly-Plates.

No. 132,065.  Patented Oct. 8, 1872.

Witnesses:
Franck L. Ourand
C. L. Evert

Inventor.
Chas. D. Everett,
Augustus Baldwin,
per Alexander Mason
Attorneys.

UNITED STATES PATENT OFFICE.

CHARLES D. EVERETT AND AUGUSTUS BALDWIN, OF CLEVELAND, OHIO.

IMPROVEMENT IN FELLY-PLATES.

Specification forming part of Letters Patent No. 132,065, dated October 8, 1872.

*To all whom it may concern:*

Be it known that we, CHARLES D. EVERETT and AUGUSTUS BALDWIN, of the city of Cleveland, in the county of Cuyahoga and in the State of Ohio, have invented certain new and useful Improvements in Wheels for Vehicles; and do hereby declare that the following is a full, clear, and exact description thereof, reference being had to the accompanying drawing and to the letters of reference marked thereon making a part of this specification.

The nature of our invention consists in the construction and arrangement of felly-plates for wheels, and in the mode of fastening the tires and fellies together, as will be hereinafter more fully set forth.

In order to enable others skilled in the art to which our invention appertains to make and use the same, we will now proceed to describe its construction and operation, referring to the annexed drawing, in which—

Figure 1:
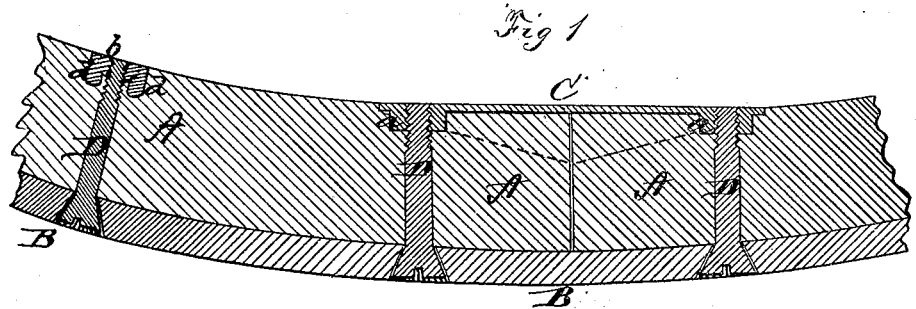
Figure 2:
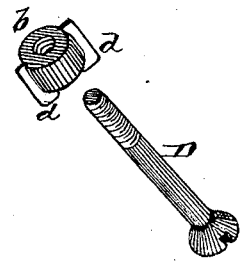

Figure 1 is a longitudinal section, showing the felly-plate and the devices for fastening the tire; and Fig. 2 is a perspective view of the device for fastening the tire at points where no felly-plate is used.

A A represent the ends of two adjoining fellies; B, the tire; C, the felly-plate; and D D, the bolts fastening the same together. The felly-plate C is provided with swells $a\ a$ on the under side at the points where the holes for the bolts go through, so that said swells, together with the plate, will be of sufficient thickness to give the necessary strength; and threads are cut in the holes for the reception of the screws or bolts D D. These bolts are to be screwed through the tire and wood into the holes in the swells and plate, and the plate in that manner drawn tightly to the wood.

By this construction of the felly-plate we dispense with the usual nuts entirely, or, rather, incorporate them with the plate. In the old style the nuts frequently loosen and shake off and are lost; also, the bolts and the plate, in consequence, may also be lost, or, at least, be of no service until again repaired, subjecting the wheel to accident. In our case no such accident can occur, for the reason that the bolts or screws cannot come out because the plate into which they screw or fit cannot turn or be turned, and the only way the plate can be taken off is by taking out the screws, mechanically, first.

The swells $a\ a$ are, of course, embedded in the wood, recesses being made in the same for that purpose.

There is also no projection above the plate. Hence, it presents a nicer and more workmanlike appearance, enabling finer and smoother work being done.

The above is more especially adapted to be used at the joints in the fellies. At other points between the joints we use a nut, $b$, with wings $d\ d$ projecting outward and downward. This nut is to be countersunk into the felly so that it will be flush with the surface of the same, and not project above, but leave an even surface, and the nut not be visible except upon close examination. The bolt D is to be put through the tire and felly and screwed into the nut so countersunk, the head of the bolt being also countersunk into the tire. The wings, projections, or points $d\ d$ on the nut are to prevent the nut from turning as the screw or bolt is being screwed into the same, the said projections or points being sunk into the grain (not across the grain) of the wood by pressure or slight tap of the hammer. This device is designed to be used between the spokes simply to hold the tire in place.

The slots or grooves in the heads of all the bolts D D should be made or cut deeper than ordinarily in order to obviate the difficulty that might arise in taking the same out in case the heads should be much worn by use.

Having thus fully described our invention, what we claim as new, and desire to secure by Letters Patent, is—

1. The combination, with the wooden felly-sections A A and tire B, of the interior joint-breaking felly-plate C, with swells $a\ a$ having screw-threads, and the screw-bolts D D, all substantially as set forth.

2. The combination of a wooden felly, A, tire B, bolt D, and nut $b$ with projections or points $d\ d$, constructed and arranged substantially as and for the purposes herein set forth.

In testimony that we claim the foregoing we have hereunto set our hands this 6th day of August, 1872.

CHARLES D. EVERETT.
AUGUSTUS BALDWIN.

Witnesses:
JESSE H. MCMATH,
OSCAR B. PERDUE.